No. 796,960. PATENTED AUG. 8, 1905.
E. H. DUNN.
EGG CANDLING APPARATUS.
APPLICATION FILED MAR. 12, 1904.

2 SHEETS—SHEET 1.

Witnesses
Inventor,
Edward H. Dunn

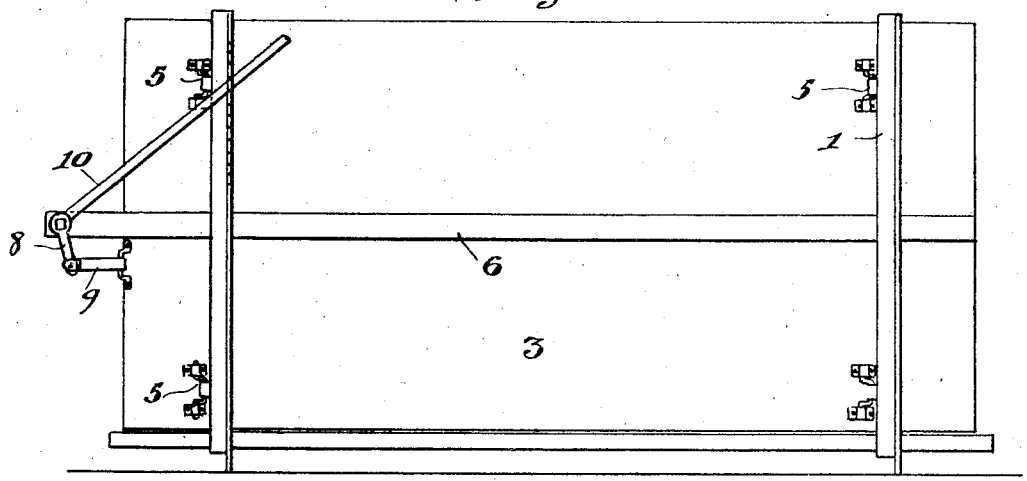
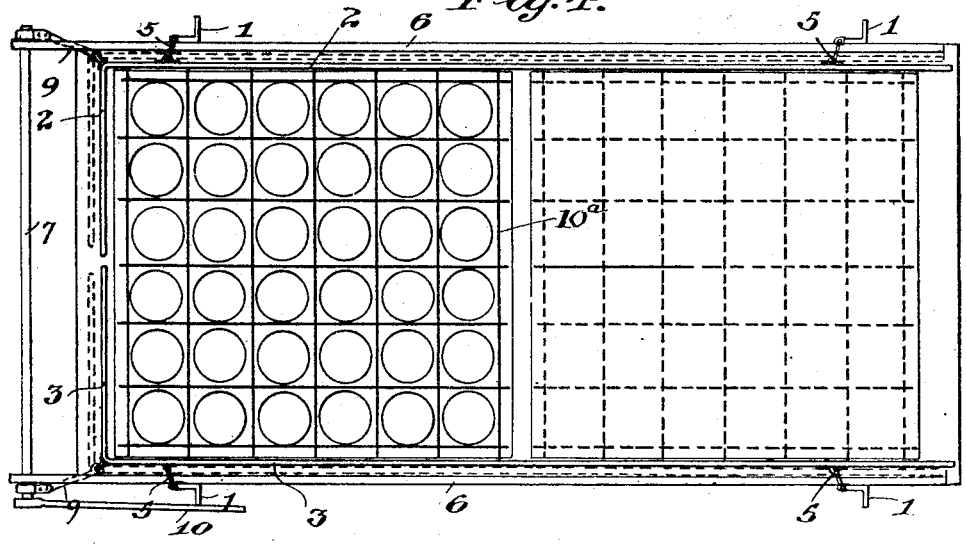

UNITED STATES PATENT OFFICE.

EDWARD H. DUNN, OF MARCUS, IOWA.

EGG-CANDLING APPARATUS.

No. 796,960.  Specification of Letters Patent.  Patented Aug. 8, 1905.

Application filed March 12, 1904. Serial No. 197,818.

*To all whom it may concern:*

Be it known that I, EDWARD H. DUNN, a citizen of the United States, residing at Marcus, in the county of Cherokee and State of Iowa, have invented a certain new and useful Improvement in Egg-Candling Apparatus, of which the following is a specification.

This invention relates to egg-candling apparatus, and particularly to an apparatus by means of which eggs in large numbers can be rapidly and safely handled during the process of candling.

Among the salient objects of the invention are to provide an apparatus by means of which eggs can be handled in layers just as they are arranged in the ordinary egg-case, one entire layer or filler full being candled at a single operation; to provide an egg-case so arranged that the layers of eggs therein may be scooped up in layers; to provide in combination therewith a light-furnishing stand to receive said tray of eggs while being exposed to the light, and in general to provide in an egg-candling apparatus of the character referred to a construction and arrangement which is practicable, convenient, and effective and by means of which eggs may be speedily and safely handled in large numbers from the cases.

From the ordinary egg-cases as at present constructed with both ends permanently closed it is, of course, impossible to scoop up the eggs in layers without first removing the end of the case, and in order to overcome this difficulty and facilitate the handling of the eggs with the candler in layers I provide a transfer-case having one end open and adapted to be inverted over the ordinary case of eggs, the whole thing then inverted and the ordinary case withdrawn, leaving the eggs in the fillers in the transfer-case and arranged in layers exposed in edge view to be picked up by the candler and exposed to the light, as hereinafter described.

The invention will be readily understood from the following description, reference being had to the accompanying drawings, forming a part thereof, and in which—

Figure 1:
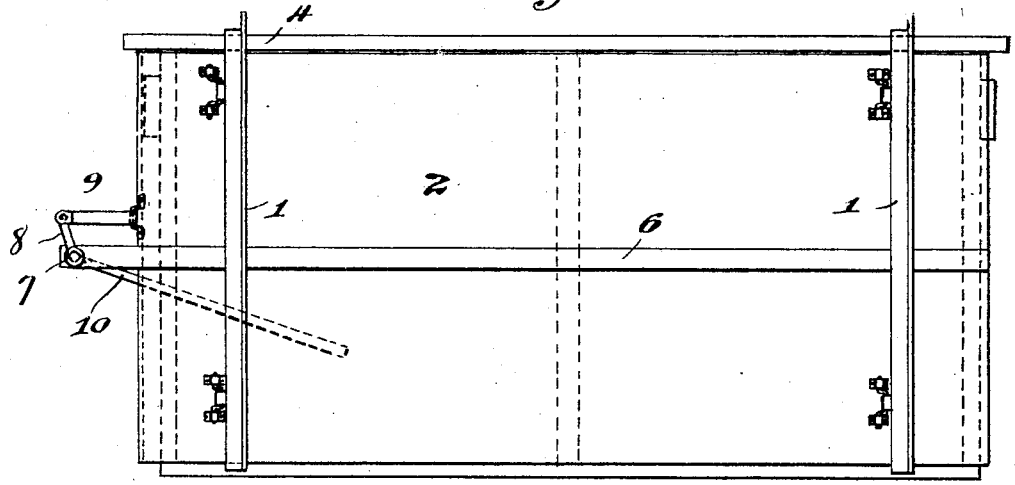
Figure 2:
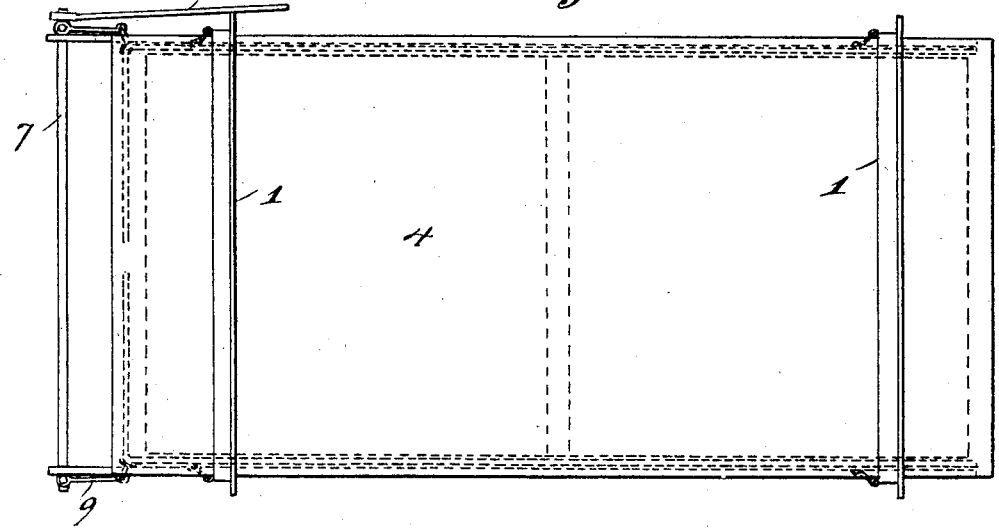

Figure 1 is a side elevation of a transfer-case inverted over an ordinary egg-case shown in dotted lines. Fig. 2 is a plan view of Fig. 1. Fig. 3 is a side elevation of a transfer-case in upright position with the ordinary egg-case withdrawn therefrom. Fig. 4 is a top plan view of Fig. 3, showing the eggs and fillers in position, one layer of eggs having been removed.

Referring to the drawings, 1 1 designate two U-shaped angle-pieces constituting a supporting-frame for a transfer-case, the sides and end of which are formed of two L-shaped or angle walls 2 3, movably mounted upon a bottom 4 and supported uprightly by means of hinge-links 5, attached to the upright arms of the U-shaped frame members 1 1. (See Figs. 3, 4.) The short arms of the angle-walls together constitute the end wall for said transfer-case, the other end being open.

6 6 designate side-bars mounted upon the arms of the U-shaped frame, so as to project past the closed end of the case, and have mounted in their projecting ends a transversely-extending rock-bar 7. Upon the ends of this rock-bar are mounted to move therewith a pair of short levers 8 8, (clearly shown in Figs. 1 to 3,) which levers are connected to the corners of said angle-walls by means of links 9.

10 designates a hand-lever rigidly mounted upon the end of the rock-bar 7, the operation of which rocks said rock-bar, which in turn moves the links 9 inwardly, causing a combined longitudinal and lateral movement of the casing-walls 2 3 toward each other, thus taking up the space occupied by the ordinary egg-case before it is withdrawn and bringing the three walls of the transfer-case into closer relation to the stacks of egg-fillers $10^a$, containing the eggs, in the manner indicated in Fig. 4.

It will thus be seen that when the transfer-case is inverted over the case of eggs and the whole inverted so that the latter can be withdrawn the layers of eggs are exposed at the open end of the transfer-case and can be readily scooped up layer by layer either before or after removing the filler from the layer of eggs and the whole layer exposed to the candling-light to determine the translucency of the eggs, and therefore their soundness.

It is obvious that changes and modifications in the details of construction and arrangement may be made from those shown without departing from the spirit of the invention, and I do not, therefore, limit the invention to these details and constructions except in so far as they are made the subject-matter of specific claims. For example, while I have herein shown and described a transfer-case which is expansible and contractible, so that it may be adjusted to approximately fit against the margins of the fillers, yet it will be obvious that it is not essential that such transfer-case be made thus adjustable. Moreover, it will be obvious that it is not absolutely essential to use a transfer-case at all, provided the shipping or storing case be so constructed as to embody the principles of the transfer-case herein described—that is to say, if the shipping-case be so constructed that it substantially corresponds to the construction of the transfer-case then the latter may be dispensed with. Accordingly the term "case" as employed in the broader claims is to be construed as not limited to a transfer-case.

I claim—

1. A portable transfer-case for eggs constructed to conform approximately to the dimensions of the ordinary egg-case and comprising a box-like casing having its top and one side open and provided with one or more adjustable walls, whereby said case can be inverted over the ordinary egg-case, the whole inverted and the latter removed, and means for adjusting said adjustable walls to take up the space occupied by said removed egg-case.

2. A portable transfer-case for eggs, comprising a box-like casing constructed to conform approximately in dimensions to the ordinary egg-case and having its top and one end open, said casing being provided with adjustable walls for expanding and contracting the interior dimensions thereof, and mechanism for moving and holding said adjustable walls in adjusted position.

3. In an egg-candling apparatus, an egg-case for receiving the eggs and holding them exposed in edge view, comprising in combination a supporting-frame, a bottom upon said frame, movable wall members mounted upon said bottom and supported in upright position by hinge-links connecting them with the supporting-frame, said wall members covering three sides of said case, and a lever mechanism connected with said frame and said wall members by means of which said wall members may be moved toward and from each other to take up space around the stacks of eggs therein, substantially as and for the purpose described.

EDWARD H. DUNN.

Witnesses:
 W. L. GUND,
 LOUIS GUND.